United States Patent
Goerick et al.

(10) Patent No.: US 7,848,565 B2
(45) Date of Patent: Dec. 7, 2010

(54) PERIPERSONAL SPACE AND OBJECT RECOGNITION FOR HUMANOID ROBOTS

(75) Inventors: Christian Goerick, Seligenstadt (DE); Heiko Wersing, Frankfurt am Main (DE); Mark Dunn, Mühlheim (DE); Julian Eggert, Obertshausen (DE)

(73) Assignee: Honda Research Institute Europe GmbH (DE)

( * ) Notice: Subject to any disclaimer, the term of this patent is extended or adjusted under 35 U.S.C. 154(b) by 1205 days.

(21) Appl. No.: 11/472,049

(22) Filed: Jun. 20, 2006

(65) Prior Publication Data

US 2007/0003130 A1    Jan. 4, 2007

(30) Foreign Application Priority Data

Jun. 27, 2005    (EP)    ................... 05013851

(51) Int. Cl.
    *G06K 9/00*    (2006.01)
(52) U.S. Cl. .................................................. 382/154
(58) Field of Classification Search ........................ None
    See application file for complete search history.

(56) References Cited

PUBLICATIONS

Atchley, P., "Allocation of Attention in Three-Dimensional Space," Chapter 19, Neurobiology of Attention, 2005, Elsevier, Inc., pp. 109-113.
European Examination Report, European Application No. 05013851.0, Nov. 3, 2008, 3 pages.
European Summons to Attend Oral Proceedings Pursuant to Rule 115(1) EPC, European Application No. 05013851.0, Feb. 11, 2009, 3 pages.
Maki, A., "Stereo Vision in Attentive Scene Analysis," Dissertation, Computational Vision and Active Perception Laboratory (CVAP), Stockholm University, Mar. 1996, pp. 162 pages.
Communication Under Rule 71(3) EPC, European Application No. 05013851.0, Jun. 25, 2009, 25 pages.
Provision of the Minutes in Accordance with Rule 124(4) EPC, European Application No. 05013851.0, Jun. 23, 2009, 7 pages.
Bloch, I., "Fusion d'Informations en Traitement du Signal et des Images," 2003, Hermes Science Publications, pp. 65-73. (Summary of relevance provided in EPO Search Report).
European Search Report, EP 05013851, Dec. 20, 2005, 10 pages.
Garcia, L-M. et al., "Tracing Patterns and Attention: Humanoid Robot Cognition," IEEE Intelligent Systems, Jul. 2000, pp. 70-77.
Goncalves, L.M. et al., "Towards a Framework for Robot Cognition," Computational Intelligence in Robotics and Automation, IEEE, 1999, pp. 288-293.

*Primary Examiner*—Vikkram Bali
*Assistant Examiner*—Elisa M Rice
(74) *Attorney, Agent, or Firm*—Fenwick & West LLP

(57) ABSTRACT

A method for generating a saliency map for a robot device having sensor means, the saliency map indicating to the robot device patterns in the input space of the sensor means which are important for carrying out a task; wherein the saliency map comprises a weighted contribution from a disparity saliency selection carried out on the basis of depth information gathered from the sensor means, such that a weighted priority is allocated to patterns being within a defined peripersonal space in the environment of the sensor means.

6 Claims, 5 Drawing Sheets

PERIPERSONAL SPACE AND OBJECT RECOGNITION FOR HUMANOID ROBOTS

FIELD OF THE INVENTION

The present invention is related to the field of object recognition and more particularly to object recognition in real world tasks.

BACKGROUND OF THE INVENTION

The object recognition in real-world tasks has to decide about the identity of a presented object. The most general case of object recognition is unsolved. In order to constrain the task common approaches use several segmentation algorithms based on color, motion, edges. This is often not robust. Two major difficulties of object recognition are shift and scale invariance. In common approaches recognition uses the models of objects on multiple positions and tries to match the right one. Such procedure considerably slows down the recognition. The actively moving cameras can solve the problem of shift-invariance by focusing the object. This principle is used by several tracking systems. An object recognition system that can be used in the context of the present invention is described in U.S. Pat. No. 6,754,368 which is incorporated by reference herein in its entirety.

What is needed is a system and method for an object recognizing system using depth information e.g. for focusing at a pattern (object) and constraining the task (e.g., pattern recognition).

SUMMARY OF THE INVENTION

One embodiment of the present invention is a method for generating a saliency map for a robot device having sensor means. The saliency map indicates to the robot device patterns in the input space of the sensor means which are important for carrying out a task. The saliency map comprises a weighted contribution from a disparity saliency selection carried out on the basis of depth information gathered from the sensor means such that a weighted priority is allocated to patterns being within a defined peripersonal space in the environment of the sensor means.

The contribution from the disparity saliency selection is combined with a weighted visual saliency selection and weighted motion selection in order to generate the saliency map.

According to another aspect a method for calculating actuator command signals for a robot device having sensor means, comprises the steps of: (a) generating a saliency map according to the method as described above, the saliency map indicating to the robot device patterns in the input space of the sensor means which are important for carrying out a task of the actuator, and (b) transforming the saliency map into an actuator control command space.

Such a saliency map can be used for a gaze selection.

A further aspect of the invention, related to a pattern recognition method, comprising the steps of: (a) generating a saliency map by the method as described above, and (b) carrying out a pattern recognition limited to patterns within the peripersonal space.

The invention also related to a computer software program product, implementing such a method when running on a computing device.

The invention also relates to a robot device having sensor means designed to gather spatial information from a sensor input space, the device being programmed to carry out a such a method.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

Further advantages, features and objects of the present invention will become evident from figures of the enclosed drawings and the following description of a preferred embodiment.

DETAILED DESCRIPTION OF THE INVENTION

Figure 1:
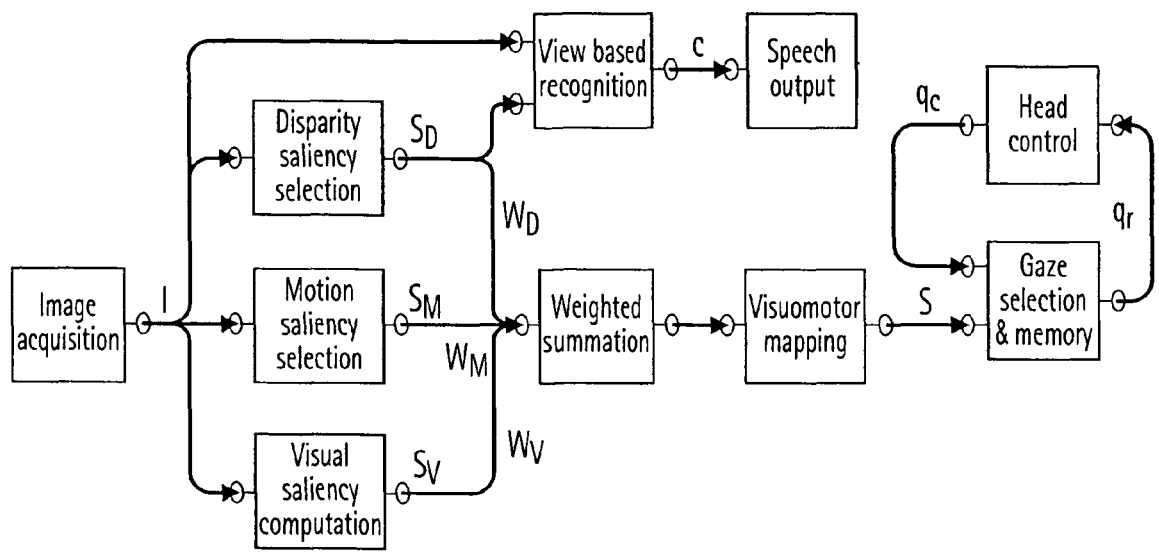
FIG. 1 shows a block diagram of an implementation of the present invention.

A preferred embodiment of the present invention is now described with reference to the figures where like reference numbers indicate identical or functionally similar elements. Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

In the present invention the peripersonal space is a predefined depth interval of the input space of a sensor of e.g. a humanoid robot. As the sensor will have to detect whether a sensed object is within this space or not, it is capable of gathering depth information. The predefined depth interval can be selected e.g. to be adjacent to the sensor and furthermore be optionally confined by sensoring angles (or x- and y-ranges).

According to one example this peripersonal space can e.g. be defined as the space wherein the robot being provided with such sensor means can reach out to manipulate objects. The benefit of using this concept is that it leads to a robust interaction and recognition and allows to build up the higher level abilities on the base of stable complete closed-loop system.

The full concept of peripersonal space includes sensory perception as well as manipulation.

One example of a technical system used for experiments is depicted in FIG. 1. It comprises an image acquisition module which supplies sensor information to a visual saliency computation module, a disparity saliency selection module and a motion saliency selection module. The output signals of these three modules are weighted and added and then supplied to a mapping module transferring the thus generated map from sensor coordinates into actuator (motor) coordinates. The saliency map can then be exploited by a gaze selection & memory unit to carry out a head control.

The weighted sum of the visual saliency computation module, the disparity saliency selection module and the motion saliency selection module can also be used to obtain a region of interest for a view-based pattern recognition. Eventually a speech output module can output the result from the pattern recognition.

The disparity of two points is their respective difference in their dislocation from a reference point (usually the center of the retinal plane). If all the parameters of the camera-setup are known, depth can be calculated from disparity.

As pointed out above, the invention uses the relation between peripersonal space and attention shifting and the consequences for object recognition.

The functional elements of the system can be described as follows: The visual saliency computation can be implemented e.g. as suggested in L. Itti, C. Koch, and E. Niebur, "A model of saliency-based visual attention for rapid scene analysis," *IEEE Transactions on Pattern Analysis and Machine Intelligence*, vol. 20, no. 11, pp. pp. 1254-1259, which is incorporated by reference herein in its entirety. This method extracts early visual features (e.g., intensity, orientation) with the help of a set of linear center-surround operations on different scales of a Gaussian pyramid created from the input image. The features are normalized and combined to produce a retinotopic saliency map Sv. In this map positions corresponding to visually interesting locations are activated, e.g., have a value between zero and one according to their degree of interestingness.

The motion saliency selection produces a map Sm with an activation corresponding to the largest connected area of motion within a defined time-span.

Figure 2:
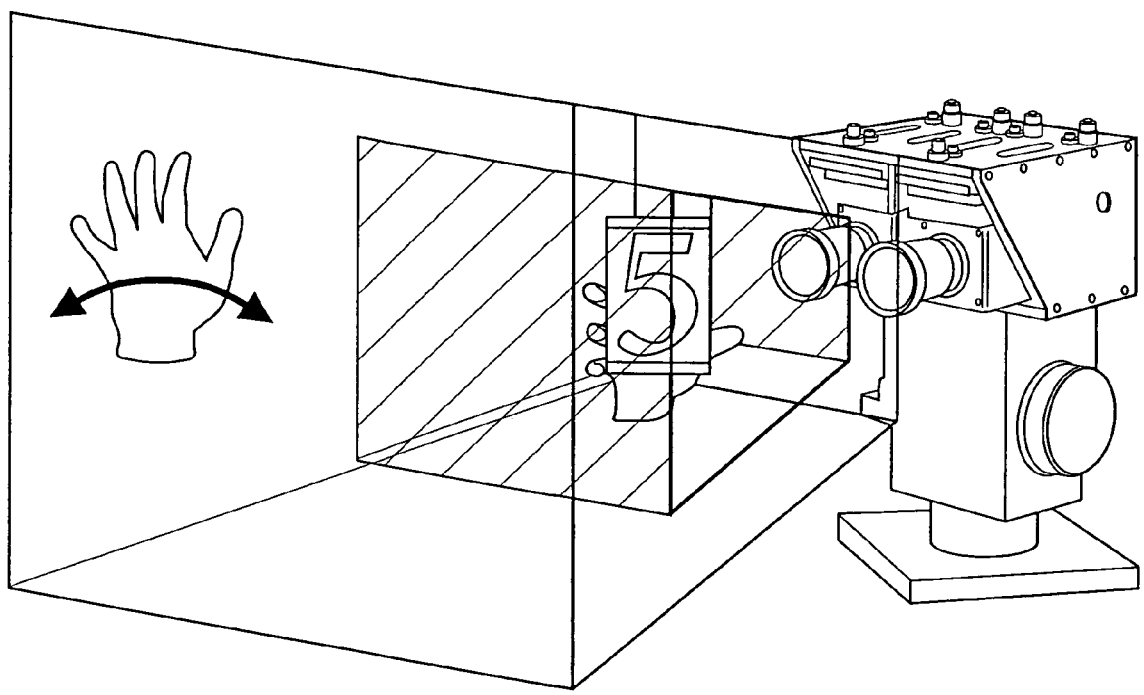
FIG. 2 is a schematic application scenario in accordance with one embodiment of the present invention.

The disparity saliency selection performs a disparity computation and selection of the closest region within a specific distance range (depth interval) and angle of view, see FIG. 2. The position of this region (e.g., the closest object within the predefined space) in image coordinates is represented as an activation within the disparity saliency map Sd. If there is no stimulus within the predefined space (e.g., the specified range and angle of view), the activation of the map is all zero. This simple mechanism represents a first approximation to the concept of the peripersonal space set forth above.

It establishes a body-centered zone in front of the robot system that directly influences the behavior of the overall system as we will show at the end of this paragraph. The selection and propagation of the closest region only corresponds to a hard weighting of the presented stimuli with respect to the "closeness" to the system. The maps of the visual saliency, the motion saliency selection and the disparity saliency selection are weighted, summed up and transformed from image-coordinates to actuator-coordinates, yielding the integrated saliency map $$S = \text{visuomotor}(wV\,SV + wDSD + wMSM) \tag{1}$$

This saliency map is the main input to the gaze selection. The gaze selection is a dynamic neural field (DNF), an integrodifferential equation modeling the dynamics of activations on the cortex. The dynamics can roughly be described as maximum selection with hysteresis and local interaction. For more details of the gaze selection see I. Mikhailova and C.

Goerick, "Conditions of activity bubble uniqueness in dynamic neural fields," Biological Cybernetics, vol. 92, pp. 82-91, 2005 that is incorporated by reference herein in its entirety.

The DNF is parameterized to yield a unique activation, which is interpreted as the target gaze direction qT. This target gaze direction is propagated to the head (sensor) control unit, which delivers the current gaze direction qC, the second input to the gaze selection.

As an example, the system can be parameterized with wV=1.0, wM=3.0 and wD=4.0. This corresponds to prioritizing the disparity information over the motion and visual saliency and the motion information over the visual saliency. With those weights the system shows the following behavior:

Without any interaction the gaze selection is autonomously driven by the visual saliency and the memory of the gaze selection. A natural way for humans is to raise the attention by stepping into the field of view and waving at the system. Due to the chosen weights the system will immediately gaze in the direction of the detected motion. The motion cue can continuously (including substantially continuously) be used in order to keep the gaze direction of the system oriented towards the hand. Continued waving while reducing the distance to the system finally leads to a hand position within the peripersonal space of the system defined by the disparity saliency selection.

Again, due to the chosen weights the signal from the peripersonal space will dominate the behavior of the system. Practically this means that the system will continuously fixate the hand and what is in the hand of the user. This kind of behavior can be used in order to perform various tasks.

Due to the gaze selection via DNF's a system as described implicitly exhibits some tracking behaviour, because selected portions of the visual field obey a hysteresis, meaning that regions near to the previously selected gaze directions are preferred over others in the next timestep. If the objects that cause the gaze selection are displaced slowly, the resulting new gaze directions tend to drift along with the objects. Alternatively, the system can be augmented with tracking behaviour, which would cause an even stronger preference to follow moving objects with the gaze. In interaction mode within the peripersonal space this can be used to maintain the fixation on selected inputs, e.g. for following and maintaining a stable sensor input of an object that should be recognized or learned. A description of tracking algorithms that are based on multi-cue low level sensory inputs without requiring a priori information of the objects/regions to be tracked can be found e.g. in M. Spengler and B. Schiele, "Towards Robust Multi-cue Integration for Visual Tracking", ICVS 2001, LNCS 2095, pp. 93-106, 2001, which is incorporated by reference herein in its entirety.

For a schematic visualization of the space in front of the system see FIG. 2. Defining the peripersonal space as a body centered volume in the space in front of the system corresponds to the biological findings. Inducing attention shifts by objects within the peripersonal space also corresponds to biological data. As discussed above, the full concept of peripersonal space includes action centered parts of the representation, but here we focus on the consequences for object recognition only.

The main problems for the recognition of rigid objects are translation, scale and three-dimensional (3D) rotation invariance as well as invariance with respect to illumination changes and occlusion. As according to the invention the classification is only performed within the peripersonal space, those invariance requirements are reduced to a large extent. Translation invariance is established by the gaze control fixating the 3D blob in the peripersonal space, while the depth information is used for improving scale invariance. Since the depth region is limited to a specific range, the occurring size variations are bound to a certain interval. The main invariances that have to be established by the classifier itself are 3D rotation, illumination changes, occlusion and the remaining position and size fluctuations that occur due to inherent fluctuations in the disparity signal.

The invention proposes a view-based approach to object recognition, where the classification is limited to objects within a predefined depth interval called peripersonal space. The underlying object hypothesis is an isolated 3D blob within the disparity map that is segmented and used to compute a region of interest (ROI) centered around the blob. The size of the ROI is dependent on the estimated distance, computed from the average disparity of the blob to obtain a coarse size normalization of objects. Using the disparity blob simplifies the invariance requirements for the recognition system as pointed out above. The current output of the classifier is the identity of the recognized object with a confidence level. The classification is entirely learned by presenting the set of objects to be recognized. It represents an example of tuning a general system to solving a specific task by learning.

Figure 3:
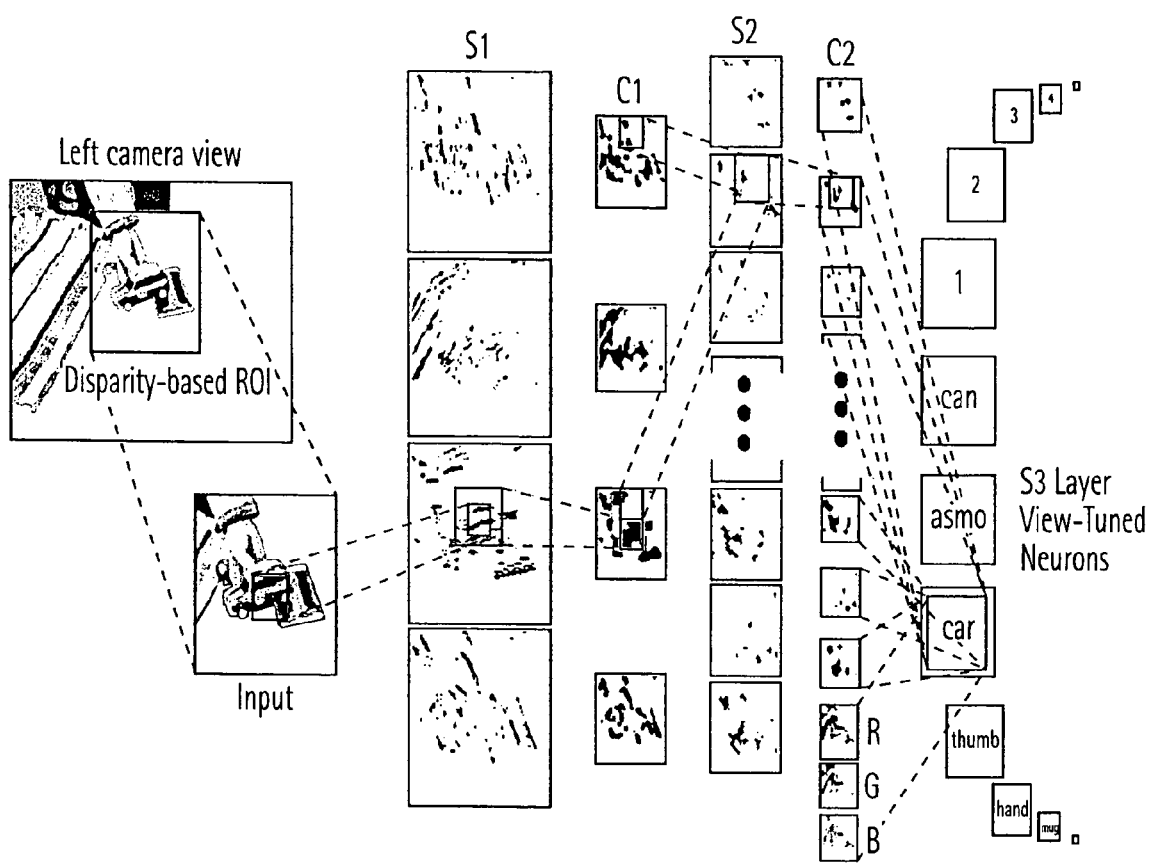
FIG. 3 shows a pattern recognition model in accordance with one embodiment of the present invention.

The object recognition module can be based on, for example, the biologically motivated processing architecture proposed in H. Wersing and E. Körner, "Learning optimized features for hierarchical models of invariant recognition," Neural Computation, vol. 15, no. 7, pp. 1559-1588, 2003 which is incorporated by reference herein in its entirety, using a strategy similar to the hierarchical processing in the ventral pathway of the human visual system. Within this model, unsupervised learning is used to determine general hierarchical features that are suitable for representing arbitrary objects robustly with regard to local invariance transformations like local shift and small rotations. Object-specific learning is only carried out at the highest level of the hierarchy. This allows a strong speedup of learning, compared to other general purpose statistical classifiers, that need large amounts of training data for achieving robustness. The input of the hierarchy is the region of interest (ROI) that is obtained from the left camera images using the disparity blob within the peripersonal space. This ROI is scaled to a defined size and provides the color input image for the following computation stages. The processing hierarchy is implemented as a feed-forward architecture with weight-sharing (see, for example, K. Fukushima, "Neocognitron: A hierarchical neural network capable of visual pattern recognition," Neural Networks, vol. 1, pp. 119-130, 1988 which is incorporated by reference herein in its entirety) and a succession of feature-sensitive and pooling stages, see FIG. 3 and the H. Wersing and E. Körner reference.

The output of the feature maps of the complex feature layer (C2) provides a general high-dimensional object representation that achieves a stronger view-based abstraction with higher robustness than the original pixel image. Classification of an input image with a resulting C2 output is done in the final S3 layer by so-called view-tuned neurons that are obtained by supervised gradient-based training of a linear discriminator for each object, based on the C2 activation vectors of a training ensemble.

In the setting that we consider here, we perform no additional segmentation of the objects to be recognized. Training is done by showing 20 different objects with changing backgrounds and we expect the learning algorithm to automatically extract the relevant object structure and neglect the clutter in the surround. To demonstrate the generality of the recognition approach we use different types of visual object classes such as number cards, hand gestures, toys, and household objects. The results and details of the training are given below.

For our experiments a stereo camera head with anthropometric dimensions as shown in FIG. 2 has been used. It has a pan and a tilt degree of freedom and represents an eyes-on-shoulder construction.

Figure 4:
FIG. 4 illustrates the training of an recognition model in accordance with one embodiment of the present invention.
Figure 5:
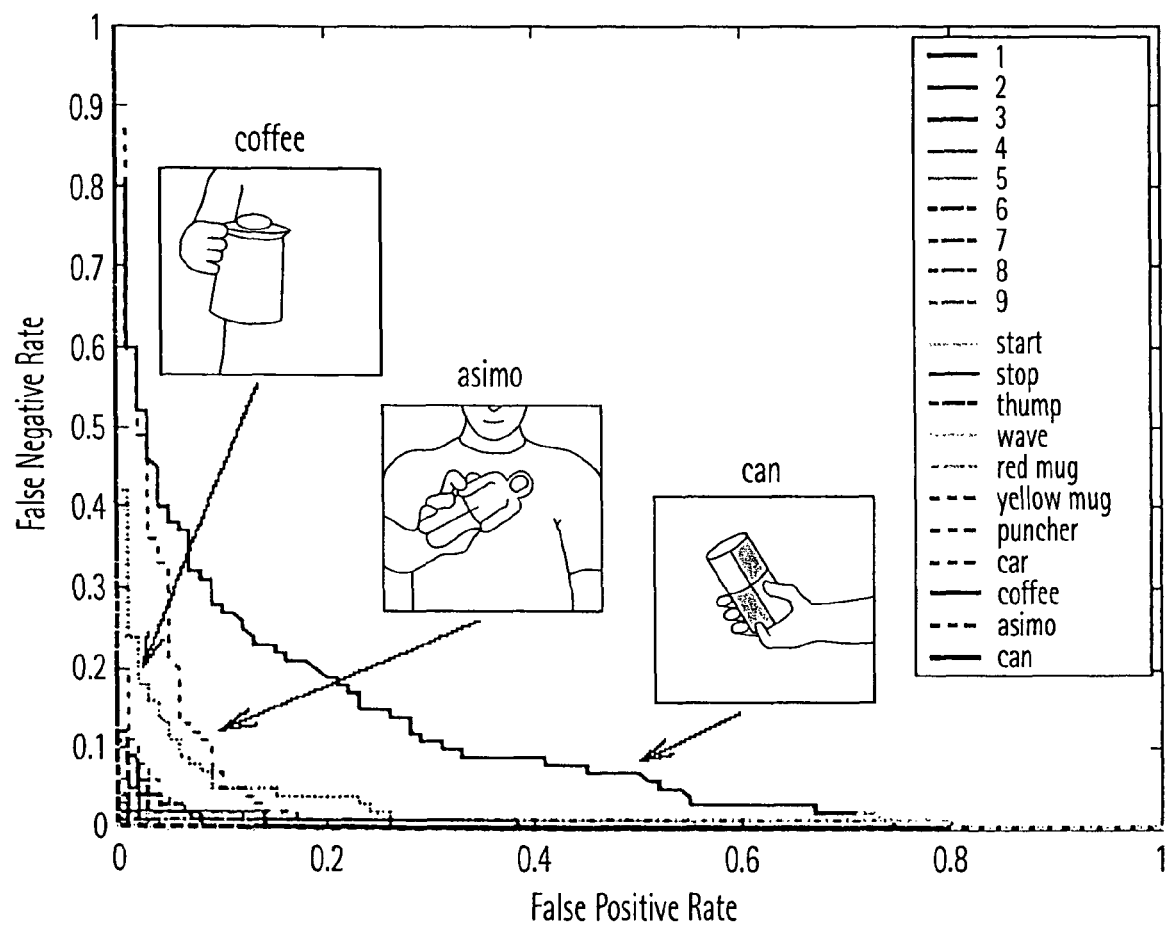
FIG. 5 illustrates the performance of the use of the invention in the framework of object recognition in accordance with one embodiment of the present invention.

The training of the recognition system has been carried out by showing 20 different objects within the interaction range and collect 600 training views for each object. The object ensemble includes of 11 sign cards, (only slight rotation deviation—max. 20 degrees), 2 hand gestures, and 7 freely rotated objects (see FIG. 4). To obtain more variations, training is done by two people. Due to inherent fluctuations of the disparity signal, the objects are only coarsely centered within the input image, and size varies about ±20% Additionally we collect 1000 views of other objects for the rejection training. For this training ensemble of 13000 views, the corresponding C2 activations are computed (with a dimensionality of 53×18×18=17172), and the S3 view-tuned neurons are trained as linear discriminators for each object within this C2 feature space (see FIG. 3).

This training takes about 30 minutes. To investigate the generalization performance of the recognition model, an independent set of test views with a third person has been recorded that did not participate in the training. For testing 100 images for each object plus additional 1000 clutter images for rejection have been collected. The results of the trained recognition system on the test ensemble are shown in the form of a an ROC plot that shows the trade-off between false positives (clutter classified as object) and false negatives (objects erroneously rejected as clutter). The plot is obtained for each object by tuning the recognition threshold from low to high values. One achieves less than 5% detection error at the point of equal false-positive and false-negative rate for almost all objects. The only exceptions are the can (20%), toy ASIMO robot (8%) and the metallic coffee can (7%). The overall classification error is 7.2%, when the class of the maximally activated view-tuned neuron is assigned as the classifier output.

Considering the object variety and the fact that no segmentation information was used for training of the architecture, the results are good. Note also that rather similar objects were contained in the rejection set, increasing the difficulty of the detection task. Also a baseline comparison has been performed, using the original RGB images with dimensionality 144×144×3 and utilize a nearest-neighbour classifier for classifying the test images with all labeled 12000 training images.

Using the plain original image data, the overall nearest-neighbour classification error is 77.5%. This underlines the advantages of the hierarchical C2 feature representation for representing object appearance in a general and robust way.

This invention integrates the object recognition into an active attentive system. This system focuses (e.g. by moving the cameras in pan and tilt direction) the salient blobs. The saliency is combined out of several channels. These are, for example, color, motion, contrast, and depth. The weighting of channels is done according to the task of the system and can change dynamically. The user can attract attention of the system by moving objects and introducing signals in the motion channel.

Another possibility of attention attraction is to put an object into a particular predefined volume in space. It extends over a certain angle of view of camera and ranges from very near range to end of a natural interaction range for human users in the depth. The system analyzes if any salient blobs are in peri-personal space. Out of these blobs the system focuses the closest one. The chosen region is proceeded to a pattern recognition system. Thus the recognition has to deal only with bounded shifts in scale and nearly no shifts in space. The choice of what objects have to be recognized can be affected dynamically by changing the weights of saliency channels.

While particular embodiments and applications of the present invention have been illustrated and described herein, it is to be understood that the invention is not limited to the precise construction and components disclosed herein and that various modifications, changes, and variations may be made in the arrangement, operation, and details of the methods and apparatuses of the present invention without departing from the spirit and scope of the invention as it is defined in the appended claims.

What is claimed is:

1. A method for gaze selection of a vision sensor in a robot device, such that a priority is allocated to problems being present within a predefined space in a depth interval, comprising the steps of:
   gathering depth information with regard to a distance from the vision sensor to one or more sensed objects; and
   generating a visual saliency map based on a vision signal received from the vision sensor;
   generating a disparity saliency selection map based on said vision signal, said disparity saliency selection map identifying a closest object of said sensed objects within a depth interval, wherein if there is no stimulus within the predefined space, the activation of the disparity saliency selection map is all zero;
   generating a motion saliency map based on said vision signal;
   generating a combined saliency map by combining said visual saliency map based upon a first weight, said motion saliency map based upon a second weight and said disparity saliency map based upon a third weight, wherein said third weight is greater than the first weight and said third weight is greater than said second weight, and the combined saliency map indicates to the robot device patterns in the input space of the vision sensor which are candidates for carrying out a task of gaze selection; and
   performing the gaze selection based upon said combined saliency map.

2. The method of claim 1, wherein the predefined space defined as the space within the predefined depth interval is further limited in at least one of the x-axis or y-axis.

3. The method of claim 1, wherein said first, second and third weights are adjustable .

4. The method of claim 3, wherein said second weight is greater than said first weight.

5. A computer software program product having a computer-readable storage medium containing computer program code for implementing a method according to the method of claim 1 when executed by a computing device.

6. A computer software program product having a non-transitory computer-readable storage medium containing computer program code for implementing a method according to the method of claim 1 when executed by a computing device.

* * * * *